Jan. 12, 1932.　　C. W. ANDREWS　　1,840,688
FURNACE OPERATION
Filed Jan. 5, 1929
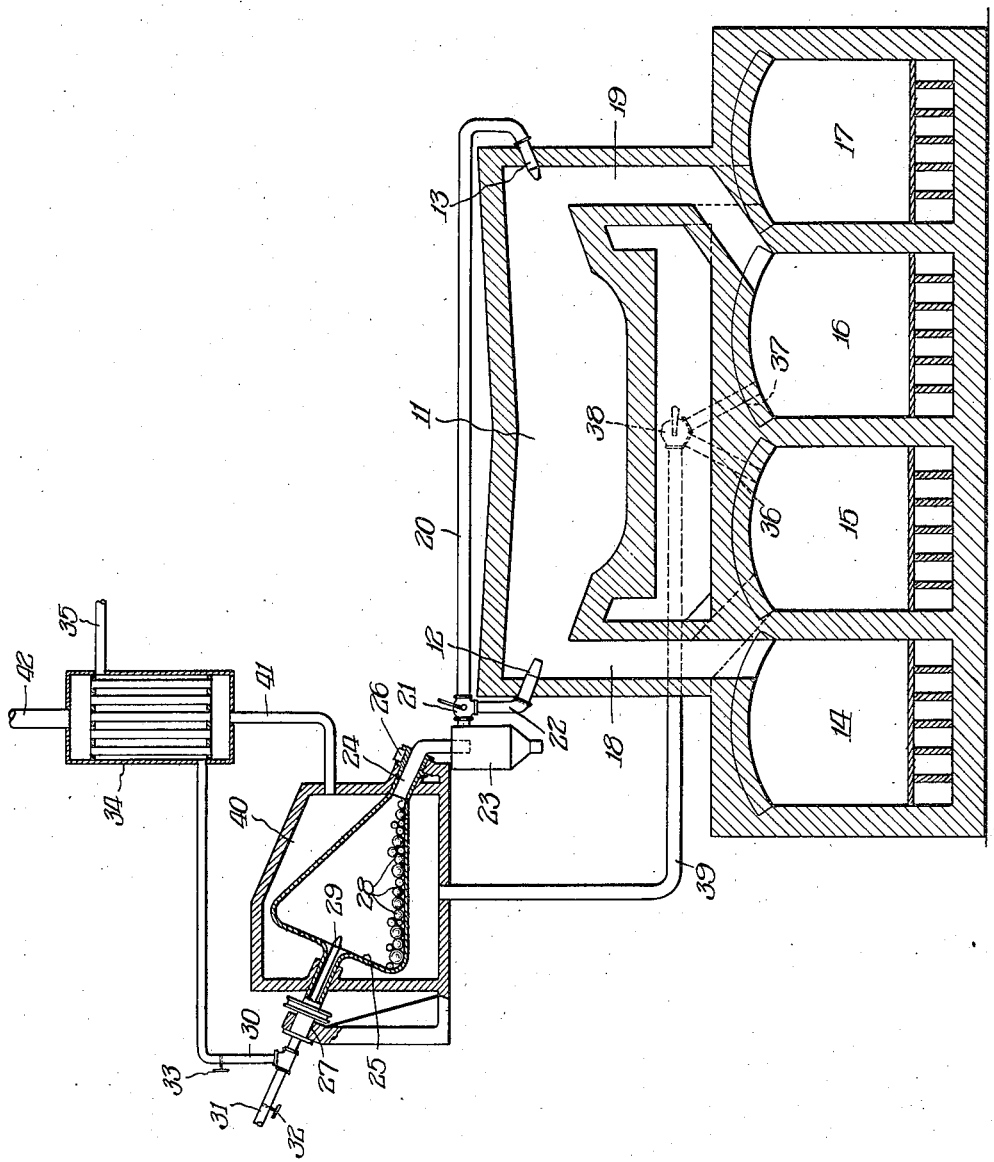
Inventor:
Charles W. Andrews,
By Wilkinson Huxley Byron + Knight
attys Patented Jan. 12, 1932

1,840,688

UNITED STATES PATENT OFFICE

CHARLES W. ANDREWS, OF CHICAGO, ILLINOIS, ASSIGNOR TO H. A. BRASSERT & COMPANY, OF CHICAGO, ILLINOIS, A CORPORATION OF ILLINOIS

FURNACE OPERATION

Application filed January 5, 1929. Serial No. 330,506.

This invention relates to a new and improved method of furnace operation and more particularly to a method of preparation and utilization of fuel in furnace operation. While my invention will be described in relation to a furnace of the open hearth type, it will be understood that it is equally applicable to other furnaces in which the same general problems of fuel supply and combustion are present. Furnaces of this type are at present generally operated upon gaseous or liquid fuels, and the fuel and air are introduced through nozzles or ports in the furnace ends.

It is an object of the present invention to provide a method and apparatus whereby liquid fuels or fuels capable of liquefaction by heat, may be gasified and vaporized and the mixed gases and vapors utilized in furnace operation.

It is a further object to provide a method and apparatus of this character in which the vapor portion of the fuel may be carried to the furnace without substantial condensation.

It is an additional object to provide a method and apparatus in which waste heat from furnace operation may be utilized in the vaporization and gasification of the fuel.

Other and further objects will appear as the description proceeds.

I have shown in the single figure of the accompanying drawing, one preferred form of construction adapted for carrying out my improved method. This showing is to be understood as diagrammatic in character.

In the drawing, the hearth of an open hearth furnace has been shown at 11, the furnace being provided with the burners or nozzles 12 and 13. The furnace is also provided with usual types of regenerators 14, 15, 16 and 17. It will be understood that according to usual practice, regenerators 14 and 15 will be operated in connection with one end of the furnace and the regenerators 16 and 17 in connection with the opposite end of the furnace. The showing is diagrammatic and the left end of the furnace is drawn to represent the incoming end. The uptake 18 connects the regenerator 14 and the end of the furnace adjacent the burner 12. Upon the right end of the furnace the downtake 19 connects the end of the furnace with the regenerator 16. The burner or nozzle 13 is connected by passage 20 with the three-way valve 21, and the burner 12 is similarly connected by passage 22 with this valve.

The dust catcher or trap 23 is interposed between the valve 21 and the opposite end 24 of the fuel treating unit or chamber 25. The chamber 25 is rotatably mounted so as to rotate in trunnions 26 and 27 about an inclined axis. The discharge end is reduced in area and the proportions are preferably such that the lower portion of the chamber during this rotation is located approximately horizontal. The chamber is filled with balls or similar pieces of material 28, which serve to break up any solid deposit.

The nozzle 29 leads in through the upper trunnion 27 and serves to introduce the material to be treated in the chamber. The nozzle 29 is connected to pipe 30, and the pipe 30 has connected thereto the pipe 31 controlled by valve 32. Pipe 31 may serve for the introduction of steam or other gaseous medium to be used in aiding the introduction of the fuel. The pipe 30 is controlled by valve 33 and leads to the heat interchanger 34. The material to be treated is fed into the unit 34 through pipe 35. The regenerators 15 and 16 are connected by passages 36 and 37 to the three-way valve 38 which connects to passage 39 leading to the chamber 40, which encloses the fuel treatment unit 25. This connection preferably leads from the hot end of the regenerators. This chamber 40 is connected by passage 41 to the heat interchange unit 34 which is provided with the uptake passage 42.

In the operation of the apparatus it will be understood that the fuel will be introduced into the furnace through the nozzle 12. Air will be preheated in the regenerators 14 and 15, and pass up into the furnace adjacent the nozzle 12. The flame will be directed upon the bath in the furnace, and the products of combustion will pass through downtake 19 to the regenerators 16 and 17. From the hot end of the regenerator 16 some of the products of combustion will pass through passage 37 and valve 38 to the passage 39. These products of combustion which will be highly heated, will enter the chamber 40 from passage 39 and will thus externally heat the fuel treatment unit 25.

From the chamber 40 the products of combustion will go through passage 41 to the heat interchange unit 34 where they will give up additional heat to the incoming fuel and will pass off through the outlet 42. The fuel, which may be tar or heavy petroleum residues, or other carbonaceous fuel capable of liquefaction or normally liquid, will be introduced through pipe 35 into heat interchanger 34, where it will be heated and will flow through pipe 30 past valve 33 into nozzle 29 where it will be discharged into the chamber 25.

If desired, steam or other gaseous medium may be introduced through pipe 31, to assist in forcing the fuel into the chamber 25 and to take part in the reaction in the chamber. The heat in the chamber 25 is such that the fuel is largely gasified and vaporized. It will be understood that the gaseous products of the chamber will contain some fixed gases and that other portions will merely be in vapor form. The proportions of gases and vapors will depend upon the material being treated and upon the temperatures utilized. Any solid deposit of the residue of the fuel will be continually broken up by the balls or other elements 28, and will thus be prevented from accumulating. The nature of the material being treated and temperatures used may be such that this residue will be a dry powder. The balls 28 also serve to aid in heat transfer. Any portions of solid or liquid residue which would tend to choke the passages or nozzles will be caught in the dust catcher 23 and periodically removed.

The valve 21 will be so adjusted at that portion of the cycle of operation now being described, that passage 20 is cut off and the mingled gases and vapors, together with any entrained solid or liquid residue will pass through pipe 22 to the nozzle 12 and will be burned in the furnace. When the furnace is reversed, the valve 21 will be changed to cut off passage 22 and to send the fuel through passage 20 to nozzle 13. The three-way valve 38 will be correspondingly adjusted to withdraw products of combustion from the outgoing regenerators.

It will be understood that the fuel treatment unit is preferably located closely adjacent the furnace, and that fuel passages between the unit and the furnace are so designed as to prevent or minimize any condensation of the vapor portion of the fuel.

It will be apparent that since my preferred method and apparatus make it possible to use vapors as well as fixed gases, the process of treatment of the fuel may be carried on at temperatures lower than are required for the complete gasification of the fuel being treated. The gasification chamber 25 will preferably be operated under pressure, but this pressure need only be sufficient to cause the gases and vapors to flow through the passages and through the nozzles in the desired manner. While the temperatures may be varied according to the circumstances and the nature of the fuel being treated, it will be understood that the temperatures will be above the usual temperatures of superheated steam. The products of combustion may reach the outer chamber 40 at approximately 1300 or 1400 degrees F., and the gases and vapors may pass out through the passage 24 at a temperature of approximately 800° F.

While the apparatus has been shown as supplying fuel to a single furnace, it will be understood that a single apparatus may, if desired, supply fuel to a plurality of furnaces of the same or different types.

While I have shown one form of apparatus suitable for carrying out my method, it will be understood that it may be carried out in other ways and in other forms of apparatus, and I contemplate such changes and modifications as come within the spirit and scope of the appended claims.

I claim:

1. The method of operating furnaces which comprises feeding heavy hydrocarbon fuel in liquid form in a closed chamber, heating said chamber externally to a temperature sufficient to vaporize a major portion of said fuel, conducting the vapors together with any gases produced by the heating to the furnace, burning said mixed gases and vapors therein, coking the solid residue in the closed chamber and removing said coke therefrom.

2. The method of producing and using furnace fuel which comprises preheating the fuel, introducing said preheated fuel in liquid form into a closed chamber, heating the chamber externally to a temperature sufficient to vaporize, to gasify and to coke different constituents of the fuel, carrying the mixed gases and vapors to the furnace without substantial condensation of the vapors, burning the mixed gases and vapors therein, and continuously breaking up and discharging the coke formed.

3. The method of producing and using furnace fuel which comprises preheating heavy hydrocarbon fuel, introducing said preheated fuel in liquid form into a closed chamber, heating the chamber externally to a temperature sufficient to vaporize and to gasify different constituents of the fuel, and to coke solid constituents of the fuel, carrying the mixed gases and vapors to the furnace without substantial condensation of the vapors, burning the mixed gases and vapors therein, removing the coke from the closed chamber, and using the heated products of combustion to preheat, vaporize, gasify and coke the fuel.

4. In combination, a furnace, a heating chamber adjacent the furnace, means leading products of combustion from the furnace to the chamber, a fuel treating chamber rotatably mounted in the heating chamber, means for introducing fuel in liquid form into said chamber, passages for conducting gases and vapors from the fuel chamber to the furnace and means for burning the gases and vapors in the furnace.

Signed at Chicago, Illinois, this 31st day of December, 1928.

CHARLES W. ANDREWS.